(12) United States Patent
Kinzel

(10) Patent No.: US 7,017,938 B2
(45) Date of Patent: Mar. 28, 2006

(54) TRANSPORT TROLLEY

(76) Inventor: Joern Kinzel, Nassauische Strasse 61, D-10717 Berlin (DE)

( * ) Notice: Subject to any disclaimer, the term of this patent is extended or adjusted under 35 U.S.C. 154(b) by 0 days.

(21) Appl. No.: 10/473,833

(22) PCT Filed: Apr. 2, 2002

(86) PCT No.: PCT/DE02/01275

§ 371 (c)(1),
(2), (4) Date: Apr. 2, 2004

(87) PCT Pub. No.: WO02/094633

PCT Pub. Date: Nov. 28, 2002

(65) Prior Publication Data

US 2004/0169353 A1 Sep. 2, 2004

(30) Foreign Application Priority Data

Mar. 30, 2001 (DE) .............................. 101 17 267

(51) Int. Cl.
*A63C 9/10* (2006.01)
(52) U.S. Cl. ........................................ 280/650; 280/62
(58) Field of Classification Search ................ 280/642, 280/644, 42, 647, 650, 62, 651
See application file for complete search history.

(56) References Cited

U.S. PATENT DOCUMENTS

| 2,120,425 | A | * | 6/1938 | Frey ........................... 280/644 |
| 2,478,512 | A | * | 8/1949 | Taylor ......................... 280/42 |
| 2,976,912 | A | | 3/1961 | Dias |
| 3,881,739 | A | * | 5/1975 | Laune ........................ 280/42 |
| 3,937,485 | A | | 2/1976 | Shourek et al. |
| 3,961,803 | A | * | 6/1976 | Fleischer ................... 280/642 |
| 4,335,900 | A | | 6/1982 | Fleischer |
| 4,659,096 | A | | 4/1987 | Leimgruber |
| 5,076,599 | A | | 12/1991 | Lockett et al. |
| 5,318,318 | A | * | 6/1994 | Berner et al. ................ 280/204 |
| 5,558,357 | A | * | 9/1996 | Wang .......................... 280/647 |
| 5,651,558 | A | * | 7/1997 | Boyce ....................... 280/304.1 |
| 5,695,212 | A | * | 12/1997 | Hinkston .................... 280/642 |

(Continued)

FOREIGN PATENT DOCUMENTS

DE 33 33 545 A1 4/1985

(Continued)

OTHER PUBLICATIONS

International Search Report of PCT/DE02/01275, dated Nov. 4, 2002.

(Continued)

*Primary Examiner*—Bryan Fischmann
(74) *Attorney, Agent, or Firm*—Christie, Parker and Hale, LLP

(57) ABSTRACT

A transport trolley for transporting goods and/or people, especially for transporting children. The trolley has a trolley frame including shoring elements and at least two wheeled devices provided on the frame and including wheels for rolling the transport trolley in a transport direction on a ground. One of the wheeled devices, as a front wheeled device in relation to the transport direction of the trolley, is arranged on the frame in front of the other rear wheeled device. The wheelbase between the front wheeled device and the rear wheeled device can be adjusted by means of an adjusting device on the trolley frame. Thereby, the wheelbase, i.e. the distance between a wheel of the front wheeled device and a wheel of the rear wheeled device, can be modified if necessary. When said transport trolley is pushed by a person, for example at a running pace, a longer wheelbase of the trolley is required for achieving the necessary tilting stability.

24 Claims, 14 Drawing Sheets

U.S. PATENT DOCUMENTS

| | | | |
|---|---|---|---|
| 5,765,856 A | 6/1998 | Kiser | |
| 5,975,559 A * | 11/1999 | Zonka | 280/650 |
| 6,017,051 A | 1/2000 | Thimmig | |
| 6,101,678 A * | 8/2000 | Malloy et al. | 16/438 |
| 6,276,759 B1 * | 8/2001 | Lan | 301/111.06 |
| 6,533,309 B1 * | 3/2003 | Lin | 280/642 |
| 6,550,802 B1 * | 4/2003 | Sheehan | 280/658 |
| 6,722,689 B1 * | 4/2004 | Kreamer | 280/642 |
| 6,767,028 B1 * | 7/2004 | Britton et al. | 280/644 |
| 6,830,260 B1 * | 12/2004 | Everett | 280/642 |
| 2002/0050700 A1 * | 5/2002 | Stohr et al. | 280/650 |
| 2005/0140105 A1 * | 6/2005 | Hernandez | 280/62 |

FOREIGN PATENT DOCUMENTS

| | | |
|---|---|---|
| EP | 0 754 612 A1 | 1/1997 |
| EP | 1 031 490 A1 | 8/2000 |
| WO | WO 00/06437 A1 | 2/2000 |

OTHER PUBLICATIONS

International Preliminary Examination Report of PCT/DE02/01275, dated Jul. 10, 2003.

English Translation of International Preliminary Examination Report of PCT/DE02/01275, dated Jul. 10, 2003.

* cited by examiner

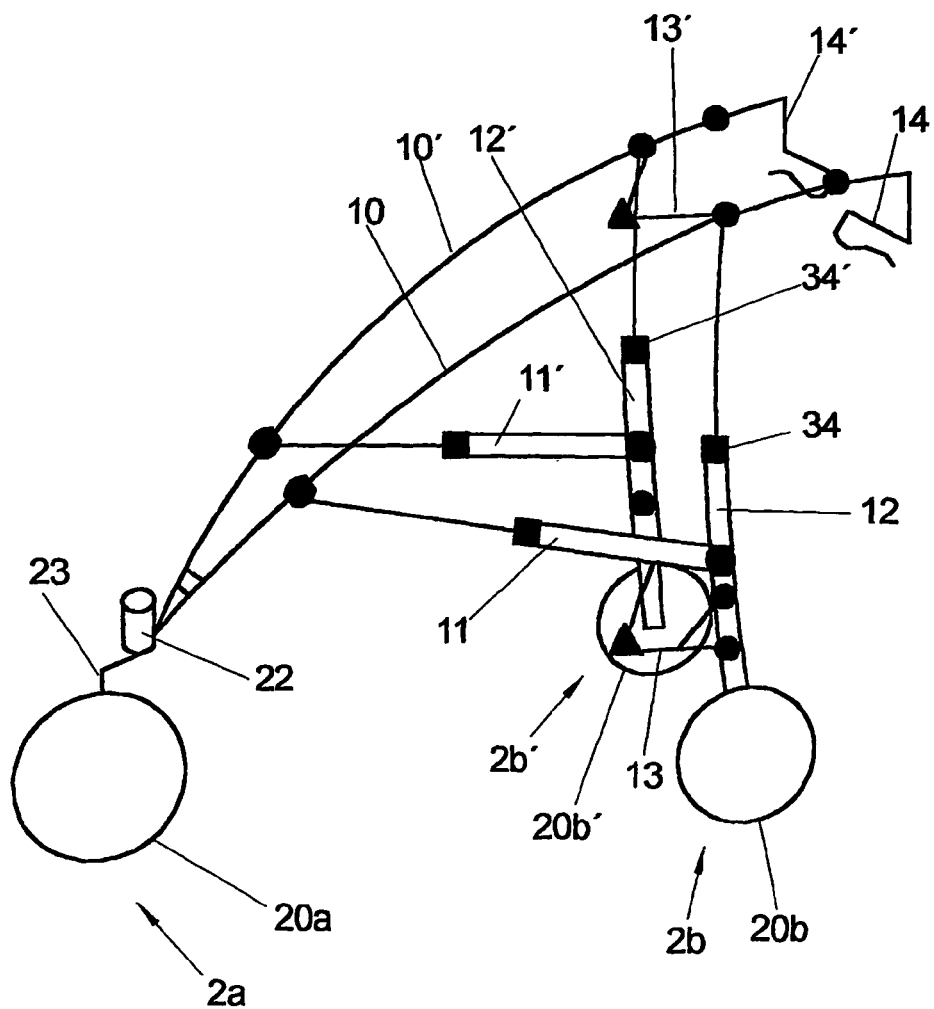

TRANSPORT TROLLEY

CROSS-REFERENCE TO RELATED APPLICATION

This application is a National Phase Patent Application of International Application Number PCT/DE02/01275, filed on Apr. 2, 2002, which claims priority of German Patent Application Number 101 17 267.2, filed on Mar. 30, 2001.

FIELD OF THE INVENTION

The invention relates to a transport trolley for transporting goods and/or people, in particular for transporting children.

BACKGROUND

Patent specifications U.S. Pat. No. 2,976,912 and U.S. Pat. No. 6,017,051 each disclose strollers of a generic type of which the wheel base between the front and rear rolling devices can be adapted in accordance with existing ambient conditions. Patent specifications U.S. Pat. No. 3,937,485 and U.S. Pat. No. 4,659,096 describe corresponding transport trolleys for transporting goods.

These transport trolleys, however, are problematic when they are moved at relatively high speeds, as are reached, for example, during jogging or inline skating. If, in particular on an uneven underlying surface, they start to tilt and fall over, there is the risk of the person who is being transported being injured and/or of the article which is to be transported being damaged.

SUMMARY

The object of the invention is to provide a transport trolley of the generic type which, as far as possible, can be used universally and is suitable, in particular, for moving at relatively high speeds, as are reached when a person who is pushing the transport trolley is jogging.

According to the invention, it is provided that the trolley frame has two main struts which, starting from the region above each of the two rear rolling devices, are arranged such that they converge in an essentially V-shaped manner in the direction of the front rolling device, and the two main struts serve as a rollover bar in the event of the transport trolley tilting over.

By virtue of the V-shaped arrangement of the main struts, the structural dimensions of the transport trolley taper in the direction of the front rolling device, starting from the rear rolling devices.

The adjusting device of the trolley frame is preferably designed as at least one length-adjustable sliding strut of the trolley frame. It would likewise be conceivable, in principle, to have an adjusting device which makes it possible to adjust the wheel base between the front and the rear rolling devices by virtue of one or more frame elements being folded or pivoted.

In the case of a preferred embodiment, the sliding strut of the trolley frame, which is provided for adjusting the wheel base, extends essentially horizontally and is arranged in the region between the front rolling device and the rear rolling devices as strut elements of the trolley frame. With a suitable design of the rest of the strut elements of the trolley frame, and the connection thereof via articulation devices, it is thus possible for the wheel base of the transport trolley to be set quickly and straightforwardly by virtue of the sliding-strut length being changed.

The main struts are preferably designed such that they curve concavely upward, i.e. away from a rolling surface of the trolley. The trolley frame thus has enough installation space, in the region between the rolling surface of the trolley and the main struts, in order to accommodate the person who is to be transported and/or the article which is to be transported.

In a preferred embodiment, the trolley frame has in each case one supporting strut between the two end sections of the main struts which are arranged above the rear rolling devices and the rear rolling devices arranged therebeneath. Furthermore, a left-hand sliding strut is arranged between the left-hand main strut, as seen in the transporting direction, and the left-hand supporting strut and a right-hand sliding strut is arranged between the right-hand main strut and the right-hand supporting strut. At least one transverse strut is arranged between the two supporting struts. In this way, the individual elements (main, sliding, supporting and transverse struts) of the trolley frame define an essentially pyramid-like cage, of which the vertex or tapered end section is arranged in the region of the front rolling device.

The fastening of the supporting struts on the main struts, of the sliding struts on the main struts and of the sliding struts on the supporting struts is ensured via articulation devices. A suitable selection and arrangement of the articulation devices ensures that the trolley frame is of folding design, in order that the transport trolley can be collapsed in a space-saving manner if required.

In a further embodiment, the transport trolley has supporting struts which are of length-adjustable design. It is possible to reduce the height of the transport trolley by virtue of, for example, telescopic shortening of the supporting struts.

In order for it to be possible for the width of the transport trolley, i.e. the distance between the two rear rolling devices, to be reduced if required, transverse struts which have an arrestable folding articulation in their center are preferably provided, the end sections of the two main struts in the region of the front rolling device being articulated such that they can be moved in relation to one another. As an alternative, it would likewise be conceivable for the transverse struts to be of telescopic design in their lengthwise direction.

It is particularly advantageous, for this purpose, for the end sections of the two main struts in the region of the front rolling device to be coupled to one another by means of a universal joint.

A preferred embodiment of the transport trolley is characterized in that the sliding struts are fixed in a releasable manner on the supporting struts by means of an articulation device, which can be displaced along the associated supporting strut and can be fixed on the supporting strut. It is likewise advantageous if the supporting struts are fixed in a releasable manner on the main struts by means of an articulation device, which can be displaced along the associated main strut and can be fixed on the main strut. By virtue of the articulation devices which connect the sliding struts to the supporting struts being released, the articulation devices, and thus the end sections of the sliding struts, can be displaced upward along the supporting struts into the region of the rotary articulation between the supporting strut and main strut. In a second step, it is then possible for the rear rolling devices arranged on the supporting struts to be swung forward in the direction of the front rolling device. This makes it possible for the transport trolley to be collapsed quickly and straightforwardly in a space-saving manner.

The transport trolley preferably has a device for accommodating an article which is to be transported and/or a person who is to be transported, the accommodating device being fixed on the sliding struts and/or on the main struts. This accommodating device either is of foldable design, such that it can be collapsed together with the trolley frame, or it is fixed in a releasable manner on the trolley frame, with the result that it can be removed before the trolley frame is collapsed.

At least one of the rolling devices preferably has a spring-mounting arrangement. The spring-mounting arrangement serves, in particular when the transport trolley is advanced over uneven underlying surfaces, for absorbing the resulting vibration forces. For this purpose, the spring-mounting arrangement preferably has a spring excursion which is at least one fifth of the diameter of the wheel assigned to the rolling device. This has the advantage that the transport trolley can be moved over rough, i.e. uneven, terrain even at a running pace without the person who is to be transported and/or the article which is to be transported being subjected to intolerable vibrations.

A preferred embodiment of the transport trolley is characterized in that the main struts and/or the supporting struts, above the rear rolling devices, have at least one handle device for holding and steering the transport trolley. This handle device may be of height-adjustable design for adaptation to the height of a person who is moving the transport trolley.

A further preferred embodiment of the transport trolley is characterized in that at least one of the rolling devices has a braking arrangement for braking the rolling movement of the transport trolley, and in that the braking arrangement can be triggered by means of an actuating arrangement provided in the region of the handle device. Possible braking arrangements here are all customary and known braking arrangements such as rim brakes, drum brakes and disk brakes. For this purpose, it is advantageous if the connecting lines between the braking arrangement and the actuating arrangement provided in the region of the handle elements are arranged in the interior of the main and/or supporting tubes.

In order to secure the transport trolley, for example in a parked position, against rolling away in an undesirable manner, it is advantageous if the braking arrangement is designed such that it can be secured by means of the associated actuating arrangement. In addition, or as an alternative, it is possible to provide an additional latching arrangement in the region of a rolling device, the latching arrangement being actuatable when the transport trolley is at a standstill and preventing the wheels from rotating.

A further preferred embodiment of the transport trolley is characterized in that the front rolling device is mounted on the trolley frame such that it can be rotated about an essentially vertically arranged axis. Such a rotatably mounted front rolling device allows the transport trolley to be rotated over a small turning circle without much force having to be exerted. The front rolling device is preferably mounted such that it can be rotated over an angle range of less than 180°. Furthermore, the front rolling device includes a mechanical restoring device by means of which the at least one wheel assigned to the front rolling device, when pivoted out of a basic position in which it is oriented essentially parallel to the running direction of the wheels of the rear rolling devices, is subjected to a torque which directs it back into the basic position.

This achieves the situation where, in order to deflect the rotatably mounted wheel of the front rolling device, it is necessary to have a torque which has to be above the torque threshold predetermined by the restoring device. This property is important, in particular, for moving the transport trolley over rough terrain, in order that the torques produced by unevennesses of the underlying surface do not result in an undesired steering movement of the transport trolley which would have to be compensated for by a corresponding counter-steering action on the part of the person who is moving the trolley.

A further preferred embodiment of the transport trolley has coupling elements for coupling a wheelchair in the region of the supporting struts, in order that the transport trolley can be moved and steered by a person using a wheelchair. The transport trolley can thus be used for wheelchair users, in particular for the purpose of transporting additional articles.

A further preferred embodiment of the transport trolley is characterized in that the front rolling device is articulated on the trolley frame such that it can be pivoted upward and fixed in a pivoted position. Additional coupling means for coupling the transport trolley to a towing vehicle, in particular to a bicycle, can preferably be fastened on the trolley frame in the region of the front rolling device. The transport trolley can thus be used easily and straightforwardly as a bicycle trailer. It is possible here for the length of the bicycle trailer to be varied by the adjustable sliding struts of the trolley frame.

Moreover, the frame of the transport trolley can be collapsed to an even smaller packing size if the front rolling device is pivoted upward in the direction of the pyramid-like cage defined by the strut elements and is fixed on the trolley frame.

In addition, it is conceivable to use a suitable arrangement to increase the spacing between the rear rolling devices in order to increase the tilting stability of the transport trolley when used as a bicycle trailer.

BRIEF DESCRIPTION OF THE DRAWINGS

Further aspects and advantages of the transport trolley according to the invention are explained hereinbelow with reference to the figures, in which:

FIG. 6b shows a second embodiment of the transport trolley shown in FIG. 6a, this trolley having supporting struts which can have their length set telescopically;

DETAILED DESCRIPTION

Figure 1:
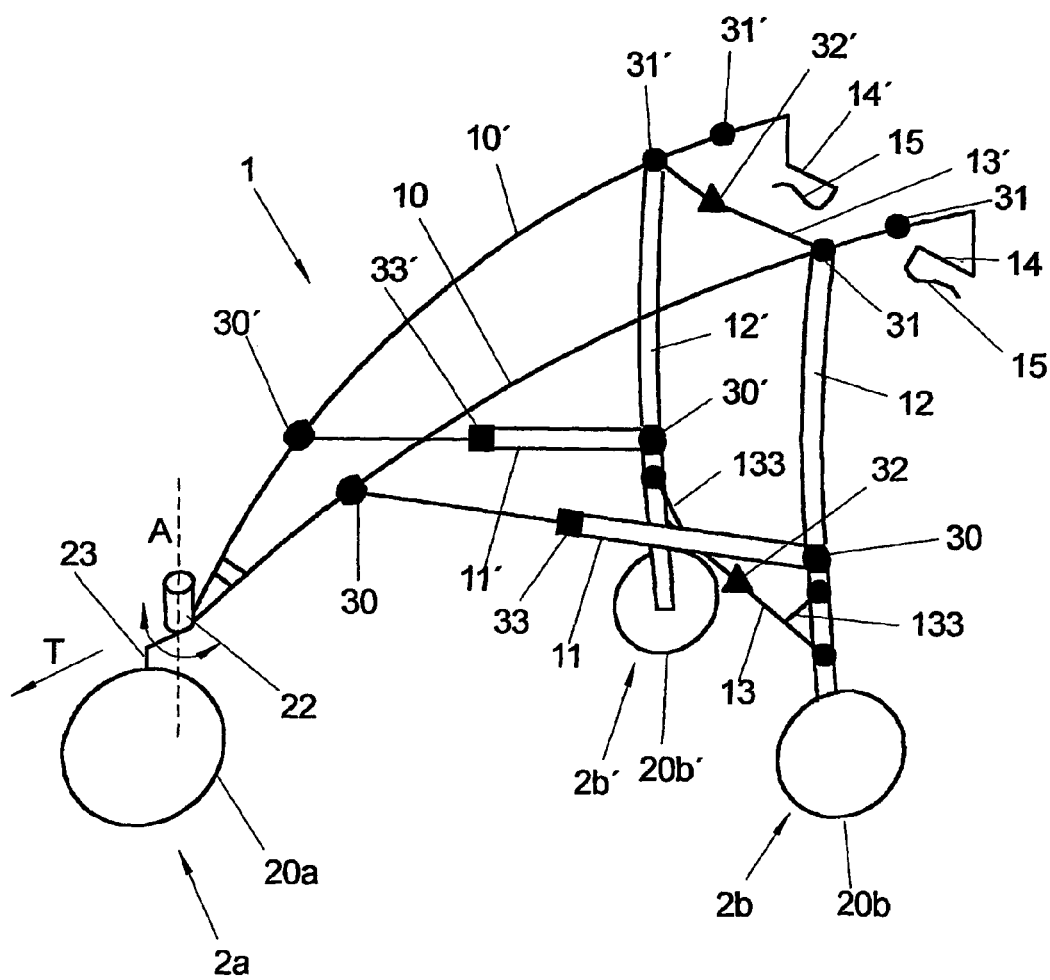
FIG. 1 shows a perspective view of a first embodiment of the transport trolley.

FIG. 1 shows a perspective view of a first embodiment of the transport trolley. The transport trolley comprises a trolley frame 1 which is constructed from strut elements 10, 10', 11, 11', 12, 12', 13, 13', 133 and on which three rolling devices 2a, 2b, 2b' are arranged. Each of the three rolling devices 2a, 2b, 2b' has a wheel 20a, 20b, 20b'. By means of the wheels 20a, 20b, 20b', the transport trolley 1 can roll in a transporting direction T along an underlying surface. As seen in the transporting direction T, one of the rolling devices is arranged on the trolley frame 1 as front rolling device 2a and the other two rolling devices are arranged thereon as rear rolling devices 2b, 2b'. Each of the three rolling devices 2a, 2b, 2b' has a spring-mounting device 21, which is not illustrated in FIG. 1 but is illustrated in detail in FIG. 9.

It is, of course, conceivable for a transport trolley according to the invention to have more than three rolling devices. Obviously, the rolling devices may be designed with more than one wheel, for example with twin tires.

The embodiment of the transport trolley which is illustrated in FIG. 1, on account of the triangular arrangement of the three rolling devices, constitutes merely a preferred, particularly compact embodiment of the transport trolley according to the invention.

Starting from the region above each of the two rolling devices 2b, 2b', the trolley frame 1 has two main struts 10, 10' which are arranged such that they converge in an essentially V-shaped manner in the direction of the front rolling device 2a. In the region above the rear rolling devices 2b, 2b', essentially vertically running supporting struts 12, 12' are articulated on the main struts 10, 10' via articulation devices 31, 31'. Starting from those end regions of the supporting struts 12, 12' which are directed toward the rear rolling devices 2b, 2b', sliding struts 11, 11' run between the supporting struts 12, 12' and those end regions of the main struts 10, 10' which are directed toward the front rolling device 2a. The sliding struts 11, 11' are fastened on the main struts 10, 10' and on the supporting struts 12, 12' by means of articulation devices 30, 30'.

The lower articulation devices 30, 30' can be moved along the main struts 10, 10' and/or the supporting struts 12, 12', and fixed, in each case together with the associated sliding strut 11, 11'. It is thus possible to set the points, defined by the articulation devices 30, 30' at which the sliding struts 11, 11' are articulated on the main struts 10, 10' and/or on the supporting struts 12, 12'.

The sliding struts 11, 11' each comprise two sub-struts and an adjustment device 33, 33'. The two sub-struts can be moved telescopically one inside the other such that the overall length of the sliding struts 11, 11' is thus changed and a set length of the sliding struts 11, 11' can be fixed by means of the adjustment device 33, 33'. It is thus possible to vary the wheel base, i.e. the distance between the front wheel 20a and the center of the imaginary connecting line between the two rear wheels 20b, 20b'. These sliding struts 11, 11' thus constitute a possible embodiment of the adjusting device for the trolley frame 1, which is intended for setting the wheel base between the front rolling device and the rear rolling devices.

The adjustment devices 33, 33' are designed, for example, as screw-action/clamping connectors which allow the length of the sliding struts 11, 11' to be set in a stepless manner. It is likewise conceivable, however, for the adjustment device 33, 33' to be designed as an arrestable bolt which can be guided through corresponding bores of the two elements of the sliding struts 11, 11', which can be displaced telescopically one inside the other such that the bolt fixes a set length of the sliding strut 11, 11'. In the case of this embodiment, stepwise length adjustment of the sliding struts 11, 11' is only possible in accordance with the spacing of the bores in the two sub-struts of the sliding struts 11, 11'.

Between the two essentially parallel supporting struts 12, 12', a first essentially horizontally arranged transverse strut 13' runs in the region of the main struts 10, 10'. A second transverse strut 13 runs in the region of the rear rolling devices 2b, 2b'. The transverse struts 13, 13' each have an arrestable folding articulation 32, 32' in their center.

The folding articulations 32, 32' are designed such that they divide up the transverse struts 13, 13' into two elements of equal length which can be folded in relation to one another once the arresting action of the folding articulations 32, 32' has been released.

In order to stiffen the trolley frame 1 defined by the main struts 10, 10', the sliding struts 11, 11', the supporting struts 12, 12' and the transverse struts 13,13', the bottom transverse strut 13 has two stabilizing arms 133. The stabilizing arms 133 run obliquely upward onto the supporting struts 12, 12' from those end regions of the bottom transverse strut 13 which are directed toward the supporting struts 12, 12'. As a result, the rectangle defined by the supporting struts 12, 12' and the transverse struts 13, 13', and thus the trolley frame 1 as a whole, is stiffened against shearing.

The strut elements 10, 10', 11, 11', 12, 12', 13, 13', 133 form a trolley frame 1 which defines a pyramid-like cage, the rectangular base surface of this pyramid-like cage being formed by the supporting struts 12, 12' and the transverse struts 13, 13'. The sliding struts 11, 11' and main struts 10, 10', which extend into the region of the front rolling device 2a starting from the supporting struts 12, 12', form the edges of the pyramid-like cage. The "height" of the pyramid may be varied here by virtue of the variable length adjustment of the sliding struts 11, 11'. It is possible for the person who is to be transported and/or the article which is to be transported to be fixed within the frame cage by means of a suitable accommodating device fastened on the trolley frame 1. The space enclosed by the strut elements is increased somewhat more on account of the upwardly directed concave curvature of the main struts 10, 10'. Moreover, the main struts 10, 10' fulfill a protective function by serving as a rollover bar in the event of the transport trolley tilting over. Moreover, it is possible for a sunshade or rain cover to be arranged along the main struts 10, 10', which is fixed in a releasable manner on the trolley frame 1, for example, by means of hook-and-loop fasteners or rubber bands.

Arranged at those ends of the main struts 10, 10' which are directed toward the front rolling device 2a is a bearing device 22, in which a bearing arm 23 is mounted such that it can be rotated about an essentially vertically arranged steering axis A. The front rolling device 2a is arranged at that end of the bearing arm 23 which is directed away from the bearing device 22. The wheel 20a of the front rolling device 2a is thus mounted on the trolley frame 1 such that it can be rotated about the steering axis A via the bearing arm 23.

Handle devices 14, 14' are fastened, via fixable upper rotary articulations 31, 31', at those ends of the main struts 10, 10' which are directed away from the bearing device 22. The handle devices 14, 14, are used, by a person who is moving the transport trolley, for the purpose of pushing or pulling and steering the transport trolley. The upper rotary articulations 31, 31' assigned to the handle devices 14, 14' are designed such that they allow a height adjustment of the handle devices 14, 14' for adaptation to the height of a person who is moving the transport trolley. Furthermore, the handle devices 14, 14' each have an actuating arrangement, designed as a braking lever 15, for a braking device (not illustrated in FIG. 1) on one of the rolling devices 2a, 2b, 2b'.

Figure 2:
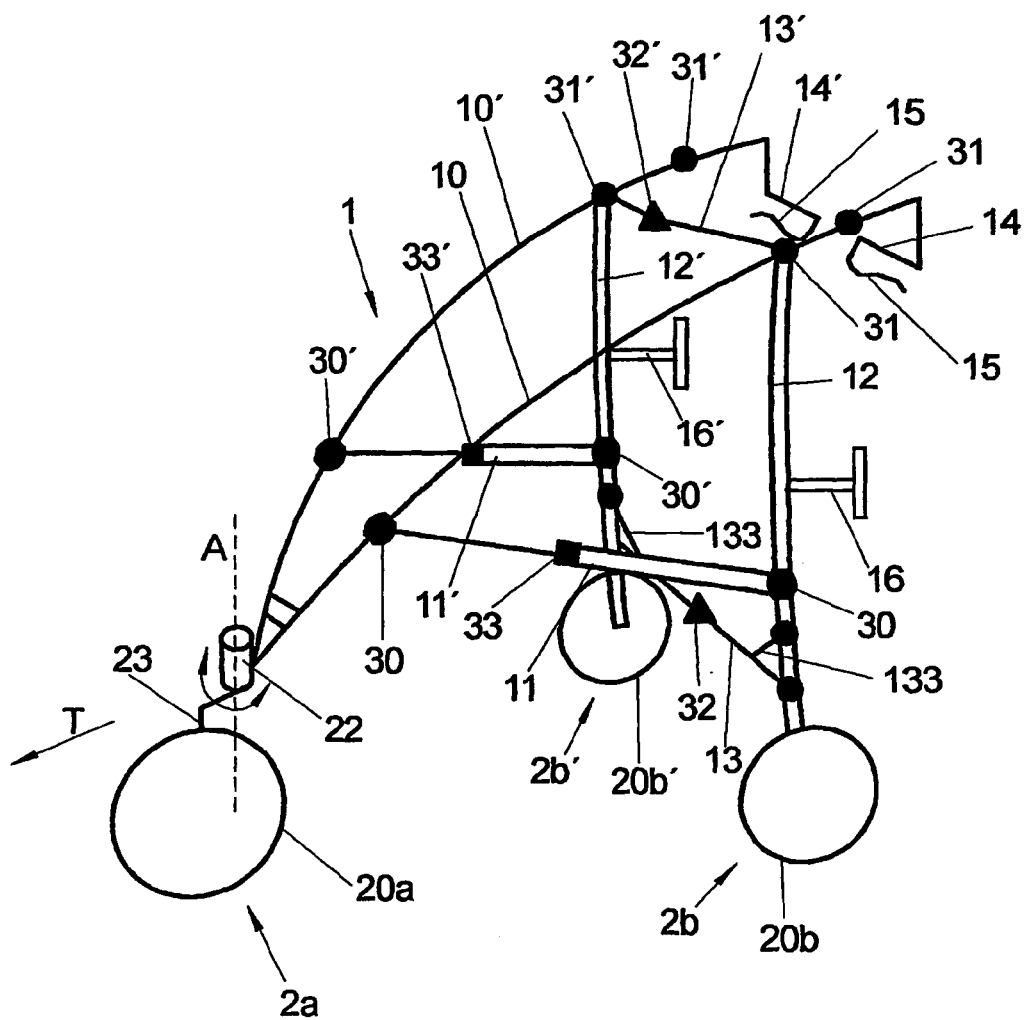
FIG. 2 shows a perspective view of the transport trolley from FIG. 1, the wheel base having been shortened in comparison with FIG. 1.

FIG. 2 shows the transport trolley from FIG. 1, the same components being provided with the same designations. In contrast to FIG. 1, the transport trolley in FIG. 2 is illustrated with a wheel base between the front wheel 20a and the rear wheels 20b, 20b' which has been shortened by way of the adjustable sliding struts 11, 11'.

This allows the overall length of the transport trolley to be shortened easily and straightforwardly, with the result that the transport trolley, for example when used as a stroller, is shorter and thus easier to maneuver. Moreover, the transport trolley with the shortened wheel base requires less stowage space, which is often a critical factor for strollers.

Furthermore, the two supporting struts 12, 12' in FIG. 2 have two coupling elements 16, 16' for coupling the transport trolley to a wheelchair.

It is thus possible for the transport trolley to be coupled to a wheelchair, with the result that a person who has to rely on a wheelchair is provided, by way of the transport trolley, with an additional means of transporting a person and/or an article which is to be transported.

Figure 3:
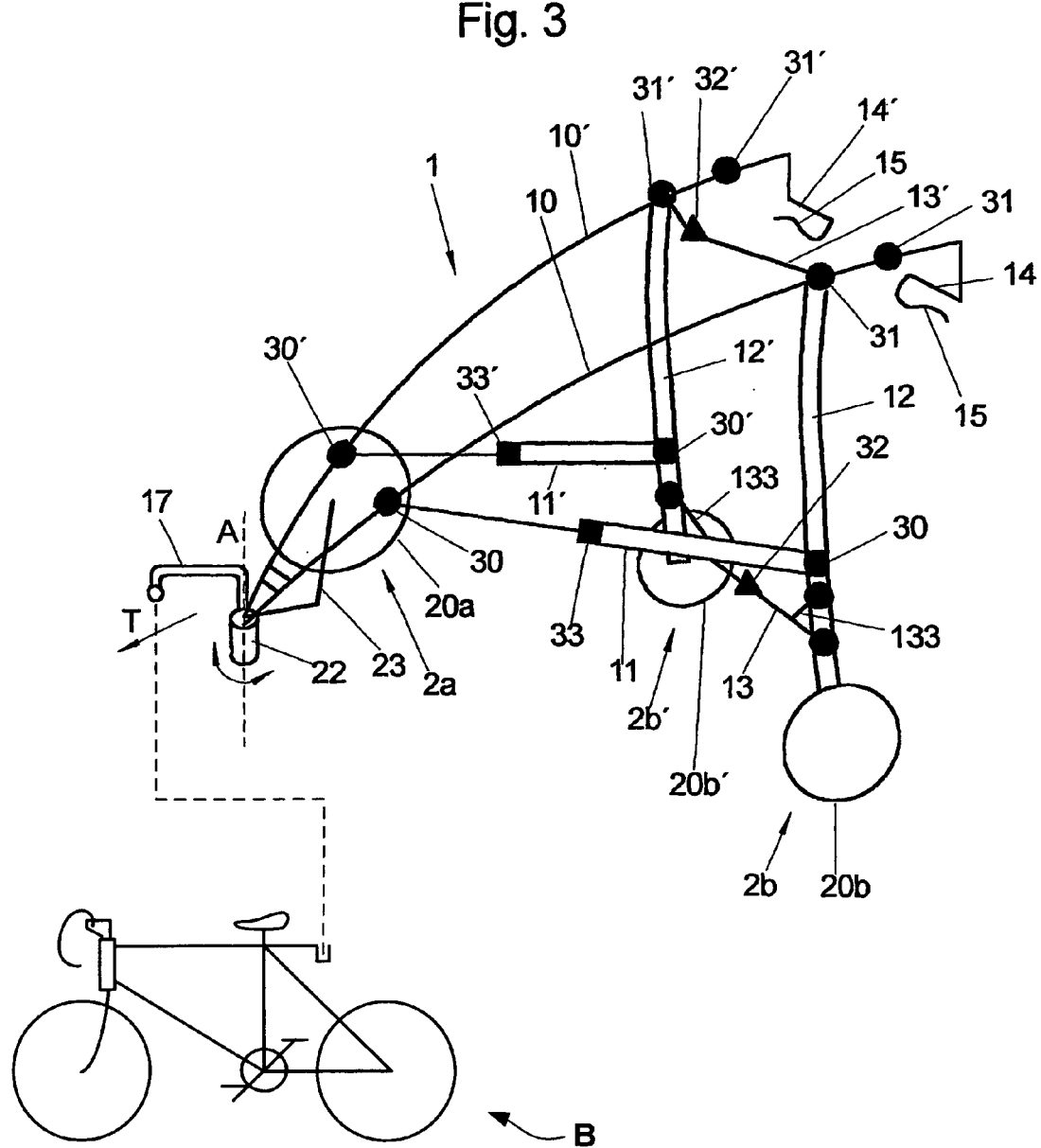
FIG. 3 shows a perspective view of the transport trolley from FIG. 1, the front rolling device having been pivoted upward and fixed on the trolley frame in order for the transport trolley to be utilized as a bicycle trailer.

FIG. 3 shows the transport trolley from FIG. 1, the same components, once again, being provided with the same designations. In contrast to FIG. 1, in the case of the transport trolley in FIG. 3, the front rolling device 2a is illustrated in a state in which it has been pivoted upward together with the bearing arm 23. The pivot axis of the bearing arm here, in the region of those ends of the main struts 10, 10' which are directed toward the bearing device, are arranged essentially horizontally. The pivoted front wheel 20a ends up located in the region of the points of articulation between the sliding struts 11, 11' and the main struts 10, 10'. In the pivoted position, the front rolling device 2a is secured on the trolley frame 1 by fixing means (not illustrated) such that it does not roll back in an undesirable manner. In addition, in the region of the bearing device 22 of the front rolling device 2a, the trolley frame 1 has a coupling means 17 which allows the transport trolley to be coupled to a towing vehicle, in particular to a bicycle "B".

Figure 8A:
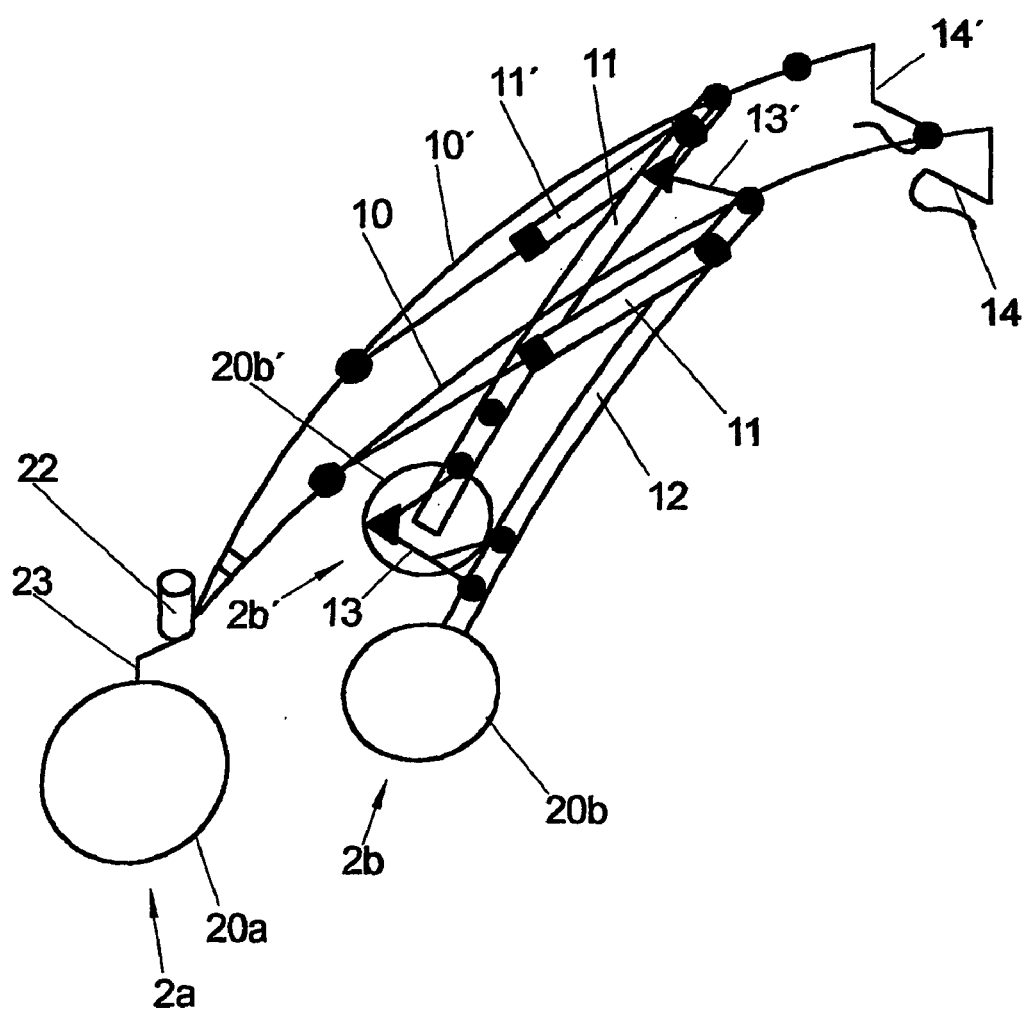
FIG. 8a shows the transport trolley from FIG. 7a, the rear rolling devices having been swung forward into the region of the front rolling device by virtue of the supporting struts being pivoted.
Figure 8B:
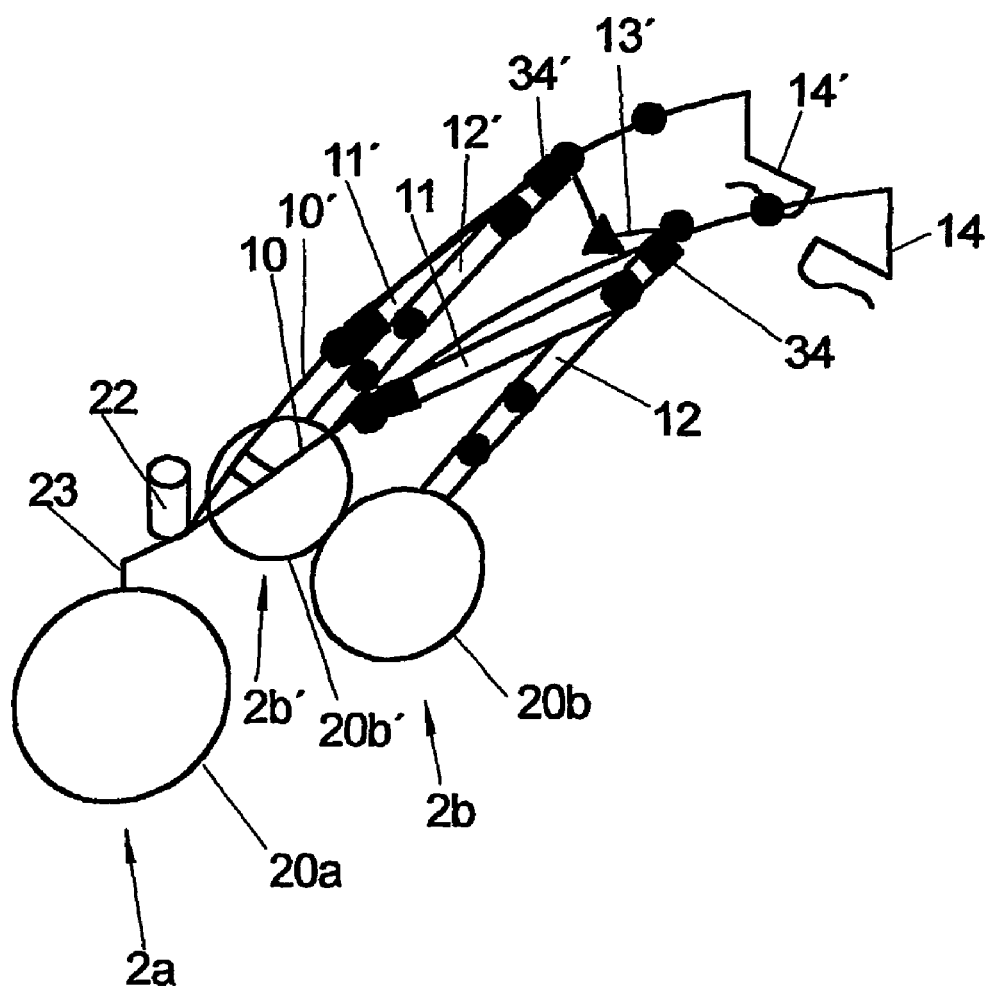
FIG. 8b shows the transport trolley from FIG. 7b, the rear rolling devices having been swung forward into the region of the front rolling device by virtue of the supporting struts being pivoted.

By virtue of the front rolling device 2a being pivoted upward, the transport trolley can be converted quickly and straightforwardly into a trailer. For use of the transport trolley as a trailer, it is advantageous for the rear rolling devices 2b, 2b' to be designed such that the distance between the rear wheels 20b, 20b' can be made greater, in order to increase the tilting moment of the transport trolley utilized as a trailer. Moreover, the additional pivoting of the front rolling device 2a makes it possible for the frame 1 of the transport trolley to be collapsed to an even smaller state than is illustrated in FIGS. 8a and 8b.

Figure 4:
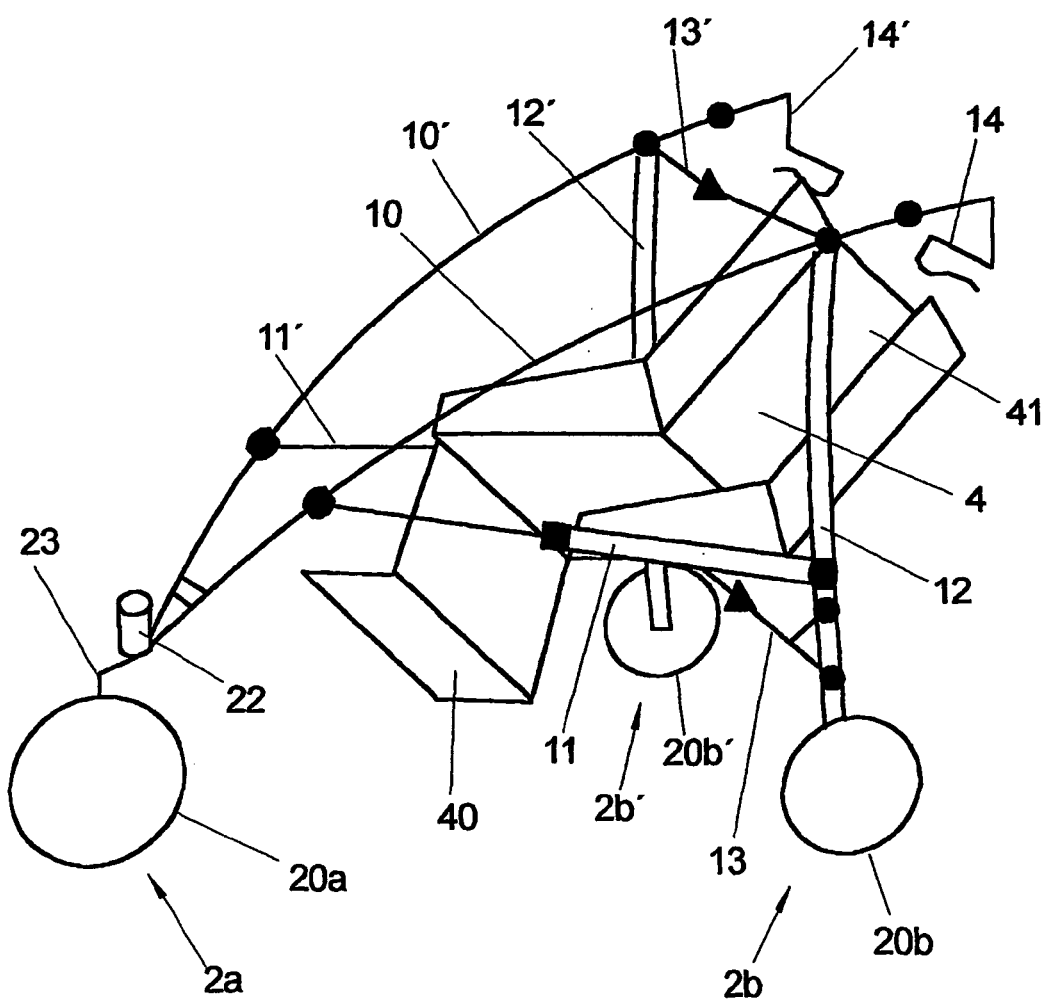
FIG. 4 shows a perspective view of the transport trolley from FIG. 1, an arrangement for accommodating a person who is to be transported having been fitted on the trolley frame.

FIG. 4 illustrates the transport trolley from FIG. 1, the difference from FIG. 1 being that a device 4 for accommodating a person who is to be transported has been arranged on the trolley frame 1. In particular for using the transport trolley as a stroller, the accommodating device 4 is designed as a suitable child seat with a height-adjustable footrest 40 and an inclination-adjustable backrest 41.

Figure 5:
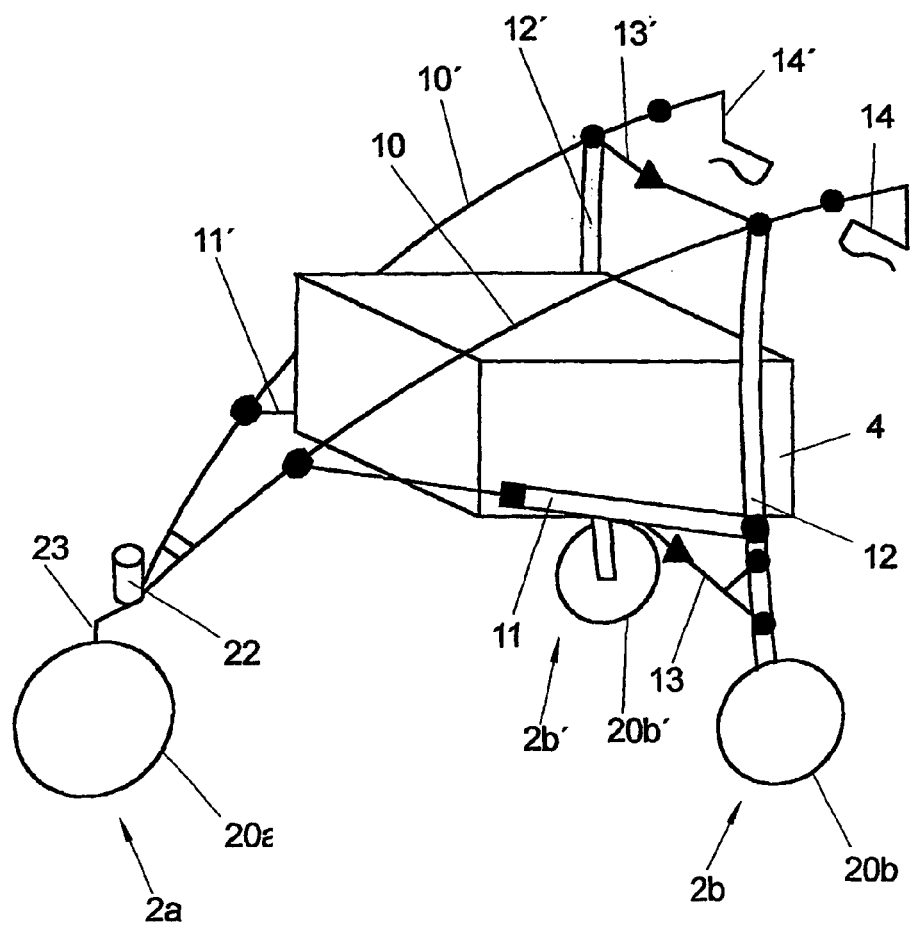
FIG. 5 shows a perspective view of the transport trolley from FIG. 1, an arrangement for accommodating an article which is to be transported having been fitted on the trolley frame.

FIG. 5, in contrast to the illustration of FIG. 4, illustrates, as an alternative, an arrangement 4 for accommodating an article which is to be transported in the transport trolley.

The accommodating arrangement 4, of course, may be adapted to the specific properties and dimensions of the article which is to be transported. It is thus possible to provide fastening means which are matched specifically to the article which is to be transported. A possible example would be fastening means matched to a drinks crate or a golf bag.

Of course, it is also possible for the accommodating arrangement 4 to be designed for the combined transportation of people and goods.

The folding mechanism of two different embodiments of the transport trolley will be explained in more detail with reference to FIGS. 6a to 8b.

Figure 6A:
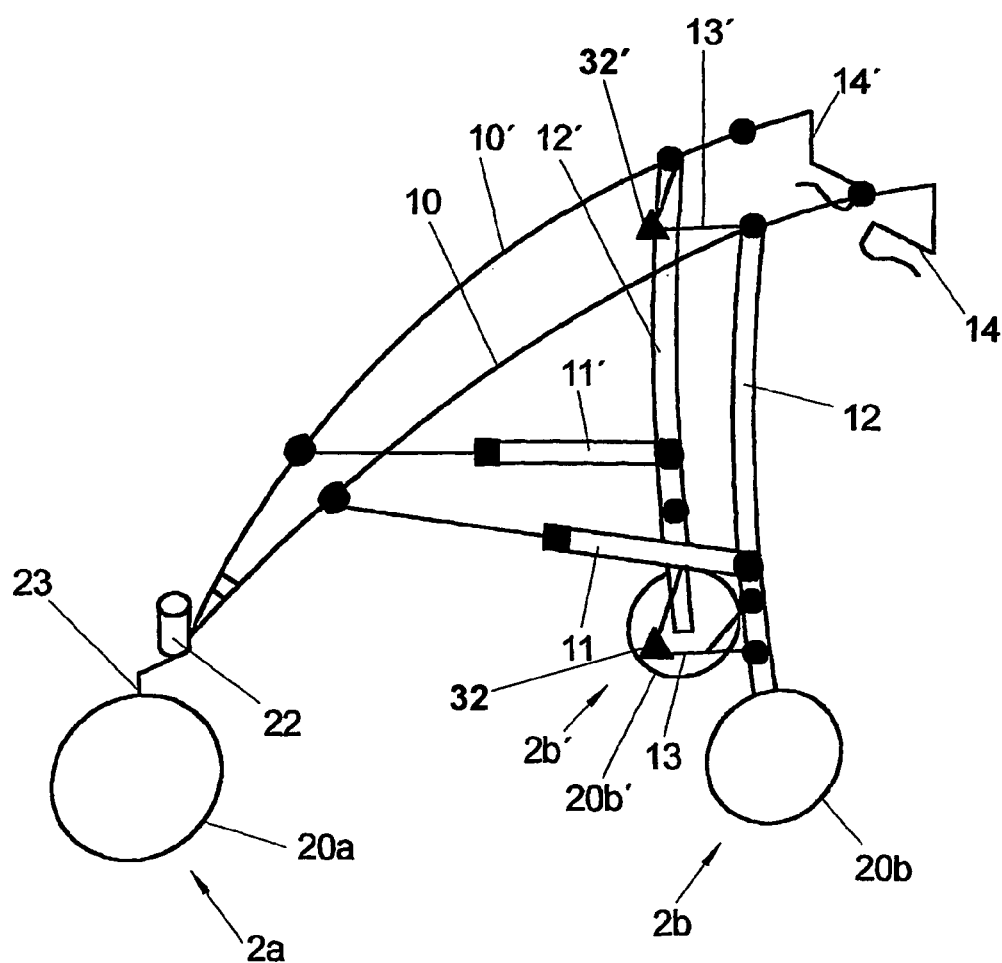
FIG. 6a shows a perspective view of the transport trolley from FIG. 1, the two rear rolling devices having been brought closer together by virtue of the transverse struts being collapsed.

FIG. 6a shows the first embodiment of the transport trolley from FIG. 1. In contrast to FIG. 1, FIG. 6a illustrates the folding articulations 32, 32' of the transverse struts 13, 13' in the unlocked state, with the result that the folding articulations 32, 32', which are arranged in the center of the transverse struts 13, 13', allow the two rear rolling devices 2b, 2b' to be brought together.

In the case of the embodiment shown in FIG. 6a, the transverse struts 13, 13' can be folded in an essentially horizontally arranged plane.

FIG. 6b illustrates a second embodiment of the transport trolley. In contrast to the first embodiment shown in FIG. 6a, the supporting struts 12, 12' of the trolley frame 1 are of telescopically length-adjustable design. For this purpose, in a manner similar to the sliding struts 11, 11', they have adjustment devices 34, 34' for setting the length of the supporting struts 12, 12'. As far as the design of the telescopically adjustable supporting struts 12, 12' and of the associated adjustment devices 34, 34' is concerned, refer to the configurations in respect of the telescopically adjustable sliding struts 11, 11' in FIG. 1.

Figure 6C:
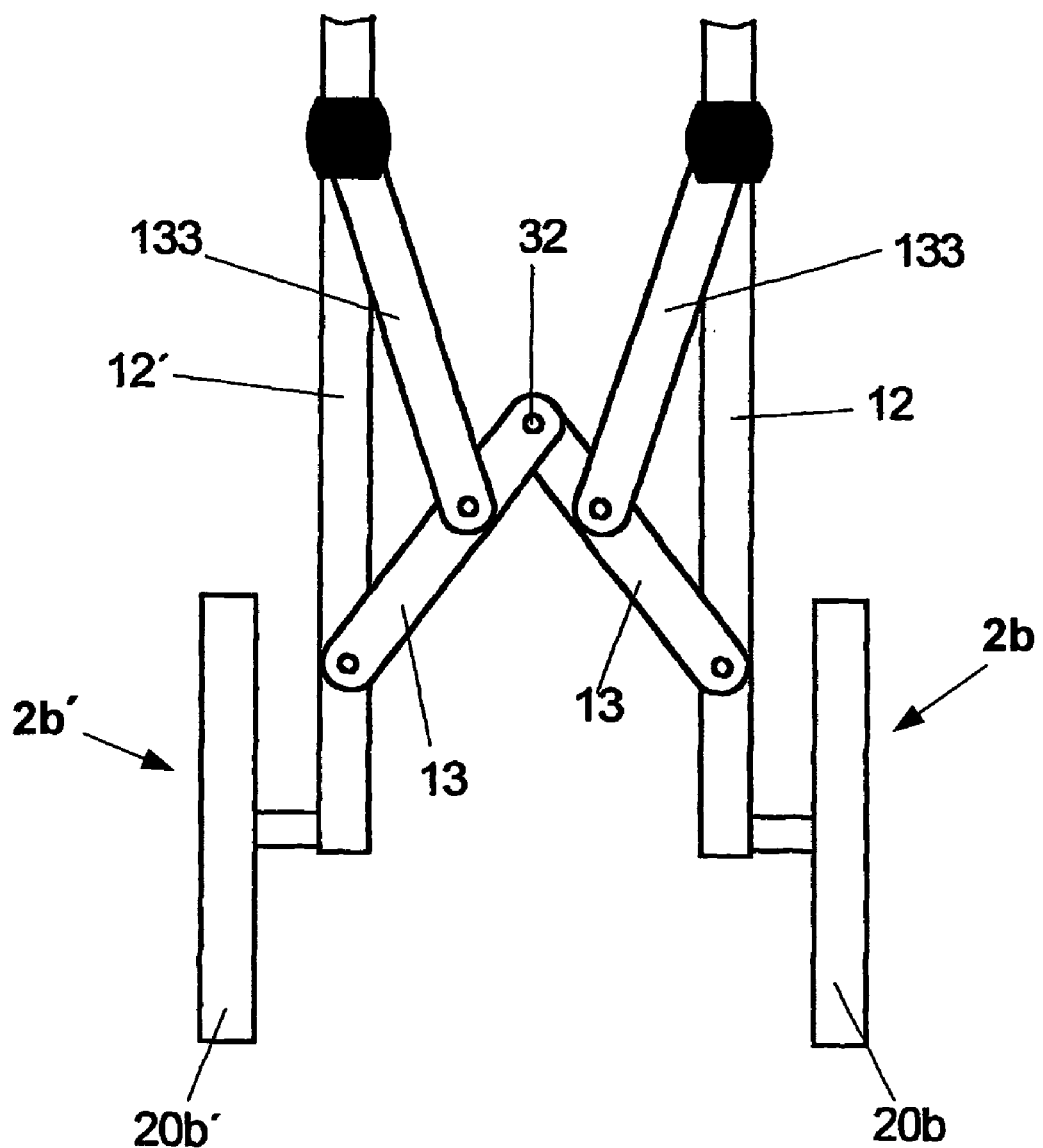
FIG. 6c shows a view, in detail form, of the rear rolling devices with a further embodiment of the mechanism for folding the transverse struts.

FIG. 6c shows a schematic view of the two rear rolling devices 2b, 2b' with the supporting struts 12, 12', the bottom transverse strut 13, in contrast to the embodiments shown in FIGS. 6a and 6b', being designed such that it can be collapsed in an essentially vertically arranged plane by means of the folding articulation 32.

This embodiment is used both for the variant of the transport trolley which is shown in FIG. 6a and for that which is shown in FIG. 6b.

Figure 7A:
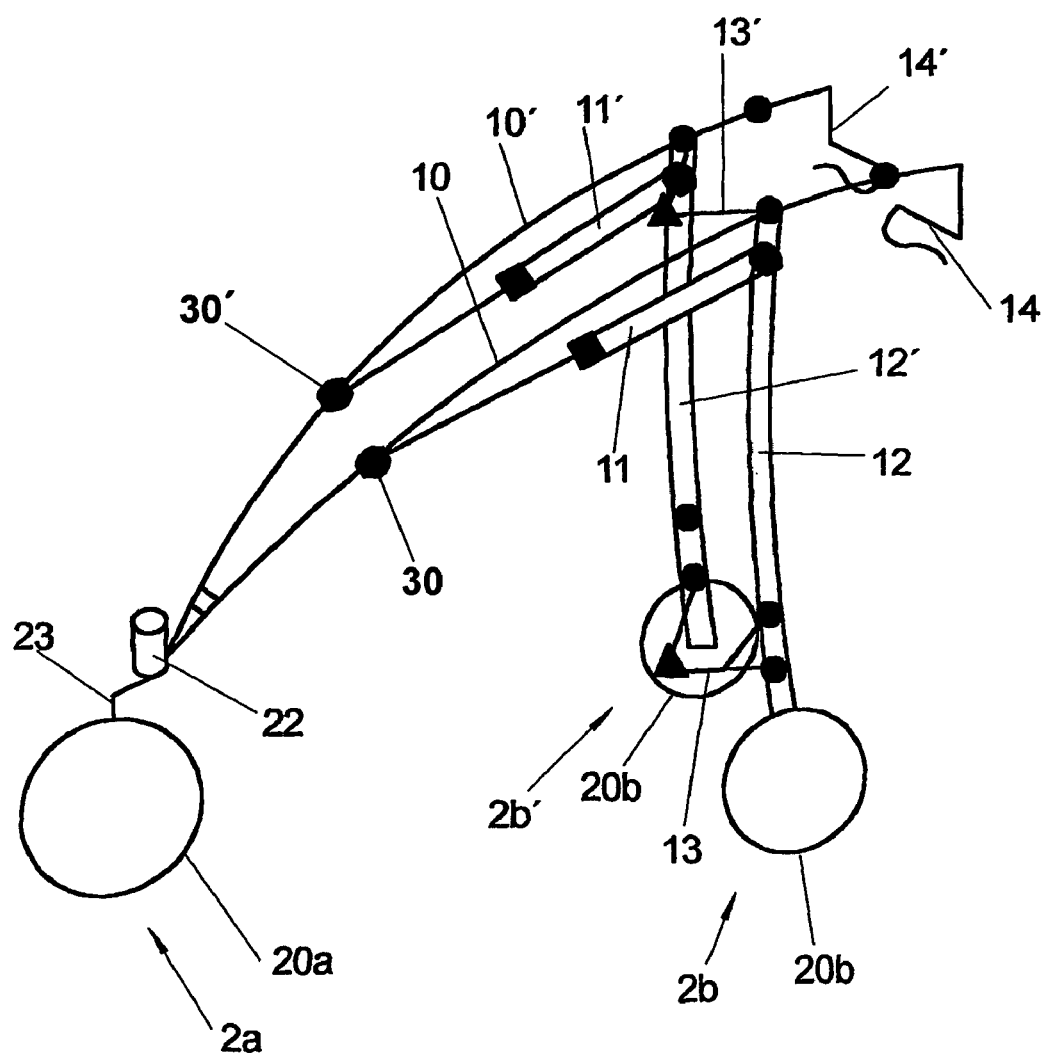
FIG. 7a shows the transport trolley from FIG. 6a, the points at which the two sliding struts are articulated on the supporting struts having been displaced upward.
Figure 7B:
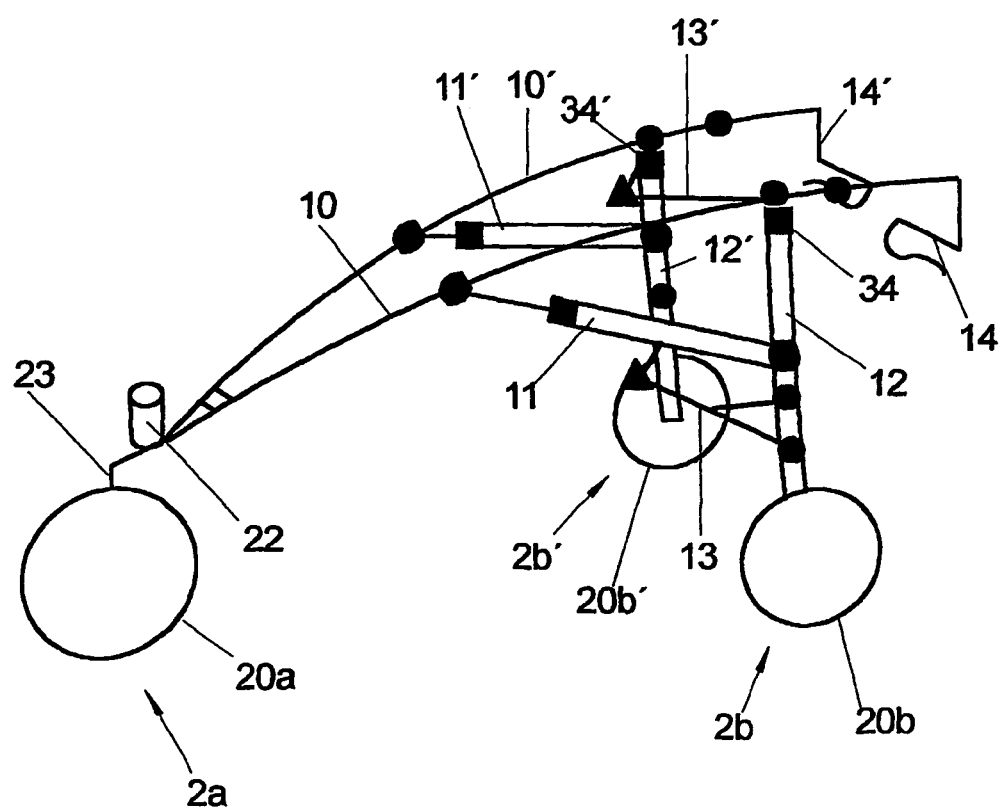
FIG. 7b shows the transport trolley from FIG. 6b, the supporting struts and the sliding struts having been shortened in length.

FIG. 7a shows the first embodiment of the transport trolley from FIG. 6a. In a further step for collapsing the transport trolley, the points, defined via the articulation devices 30, 30' on the supporting struts 12, 12', at which the sliding struts 11, 11' are articulated on the supporting struts 12, 12' have been displaced into those end sections of the supporting struts 12, 12' which are directed toward the main struts 10, 10'. There is no need here to change the length of the sliding struts 11, 11' which have been set by the adjustment devices 33, 33'.

In the final folding step for the first embodiment of the transport trolley shown in FIGS. 6a and 7a, the rear rolling devices 2b, 2b' as shown in FIG. 8a, are pivoted in the direction of the front rolling device 2a about a pivot axis which is defined by the articulation devices 31, 31' between the supporting struts 12, 12' and the main struts 10, 10'. It is thus possible for the trolley frame 1 of the first embodiment of the transport trolley to be collapsed to a compact size.

FIGS. 6b to 8b correspondingly show the operation for collapsing the trolley frame 1 of the second embodiment of the transport trolley. FIG. 7b illustrates how the supporting struts 12, 12' are shortened by means of the adjustment devices 34, 34' so as to reduce the height of the transport trolley. At the same time, it is likewise possible for the length of the sliding struts 11, 11' to be shortened by means of the associated adjustment devices 33, 33'.

In the final adjustment step, the rear rolling devices 2b, 2b' are pivoted, in a manner analogous to the illustration from FIG. 8a, in the direction of the front rolling device 2a.

In respect of the above-described folding operation for two different embodiments of the transport trolley according to the invention, it should also be emphasized that the device 4 (not illustrated in FIGS. 6a to 8b) for accommodating people who are to be transported and/or goods which are to be transported either is released from the trolley frame 1 before the transport trolley is collapsed or is designed such that it can be folded together with the trolley frame 1. In particular an accommodating device 4 configured as a child seat may be produced, for example, from textile material and designed such that the trolley frame 1 can be folded together with the child seat in accordance with the sequence illustrated in FIGS. 6a to 8b.

The front rolling device 2a is preferably of pivotable design, as is illustrated in FIG. 3. This makes it possible, for the embodiments of the transport trolley which are shown in FIGS. 6a to 8b, to achieve an even smaller packing size when the trolley frame 1 is collapsed. The folding steps shown in FIGS. 6a to 8b are then additionally supplemented by the pivoting of the front rolling device 2a according to the illustration in FIG. 3.

Figure 9:
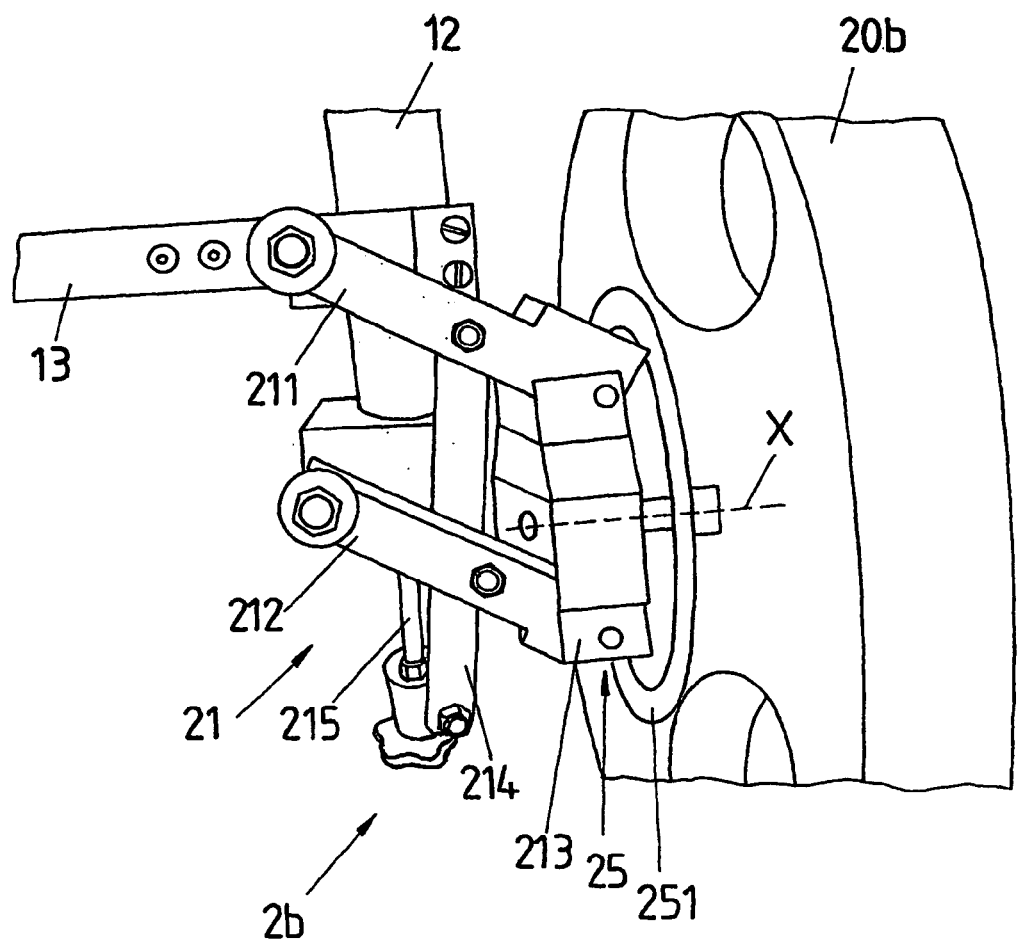
FIG. 9 shows a view, in detail form, of a rear rolling device with a spring arrangement and braking arrangement.

FIG. 9 shows a detailed view of the left-hand rear rolling device 2b, as seen in the transporting direction T, with the spring-mounting arrangement 21. The wheel 20b of the rolling device 2b is mounted in a bearing element 213, arranged along an axis X, such that it can be rotated about the axis X. Two parallel pivoting arms 211 and 212 of essentially equal length extend from the top and bottom end sections of the bearing element 213. The pivoting arms 211, 212 have their end which is directed toward the bearing element 213 articulated on the bearing element 213 such that they can be pivoted about an axis which is oriented essentially perpendicular to the axis X and essentially horizontal. Those ends of the pivoting arms which are directed away from the bearing element 213 are articulated on the trolley frame 1, in the bottom end region of the supporting strut 12, such that they can be pivoted in each case about parallel axes. The two pivoting arms 211, 212 in this arrangement describe two opposite edges of a parallelogram which, by virtue of the pivotable articulation of the pivoting arms 211, 212, shears relative to the trolley frame 1 when the wheel 20b moves. In order to cushion and to damp this shearing movement, a transverse arm 214 is arranged between the two pivoting arms 211, 212, the bottom end of said transverse arm being articulated on a spring rod 215 projecting out of the bottom end of the supporting strut 12. The spring rod 215 is in operative connection with a spring element arranged in the interior of the supporting strut 12, such that, when the spring rod 215 moves into the supporting strut 12, the spring element applies a force counter to the movement direction of the spring rod 215. When the wheel 20b moves relative to the supporting strut 12, the shearing of the pivoting arms 211, 212 thus causes a corresponding movement of the transverse arm 214 relative to the supporting strut 12. Since the transverse arm 214 is articulated on the spring strut 215, the relative movement between the transverse arm 214 and supporting strut 12 is converted into a relative movement between the spring strut 215 and supporting strut 12.

The suspension of the rear wheels 20b and 20b' which is illustrated in FIG. 9, furthermore, has the advantage that increasing weight of the article which is to be transported and/or of the person who is to be transported, even in the rest state of the transport trolley, results in increased deflection of the spring strut 215 into the supporting strut 12 and thus, on account of the upwardly moving pivoting arms 211, 212, in a greater distance between the two rear wheels 20b and 20b'. The tilting stability of the transport trolley is thus automatically increased when the transporting load is increased.

Connected in a rotationally fixed manner to the axle running along the axis X, the rolling device 2b, furthermore, has a brake disk 251. The rotation of this brake disk 251 can be braked in a conventional manner by means of a braking arrangement 25 (not illustrated in FIG. 9) arranged on the bearing element 213.

The spring element which is arranged in the interior of the supporting strut 12 (and is not illustrated in FIG. 9 either) may be designed purely mechanically and also pneumatically or hydraulically and, in addition to providing the spring property, also acts, at the same time, as a shock absorber. The entire spring-mounting arrangement 21 may be designed such that the spring excursion, i.e. the relative movement between the spring rod 215 and supporting strut 12 is at least one fifth of the diameter of the wheel 20b. It is thus easily possible to provide the transport trolley according to the invention not with maintenance-intensive pneumatic tires which are susceptible to defects, but, for example, with maintenance-free solid-rubber tires for the wheel 20b, or to do away with tires altogether and to provide wheels made of plastic or metal.

The spring-mounting arrangement 21 shown in FIG. 9 is arranged in a correspondingly mirror-inverted manner on the second rear rolling device 2b'.

Figure 10:
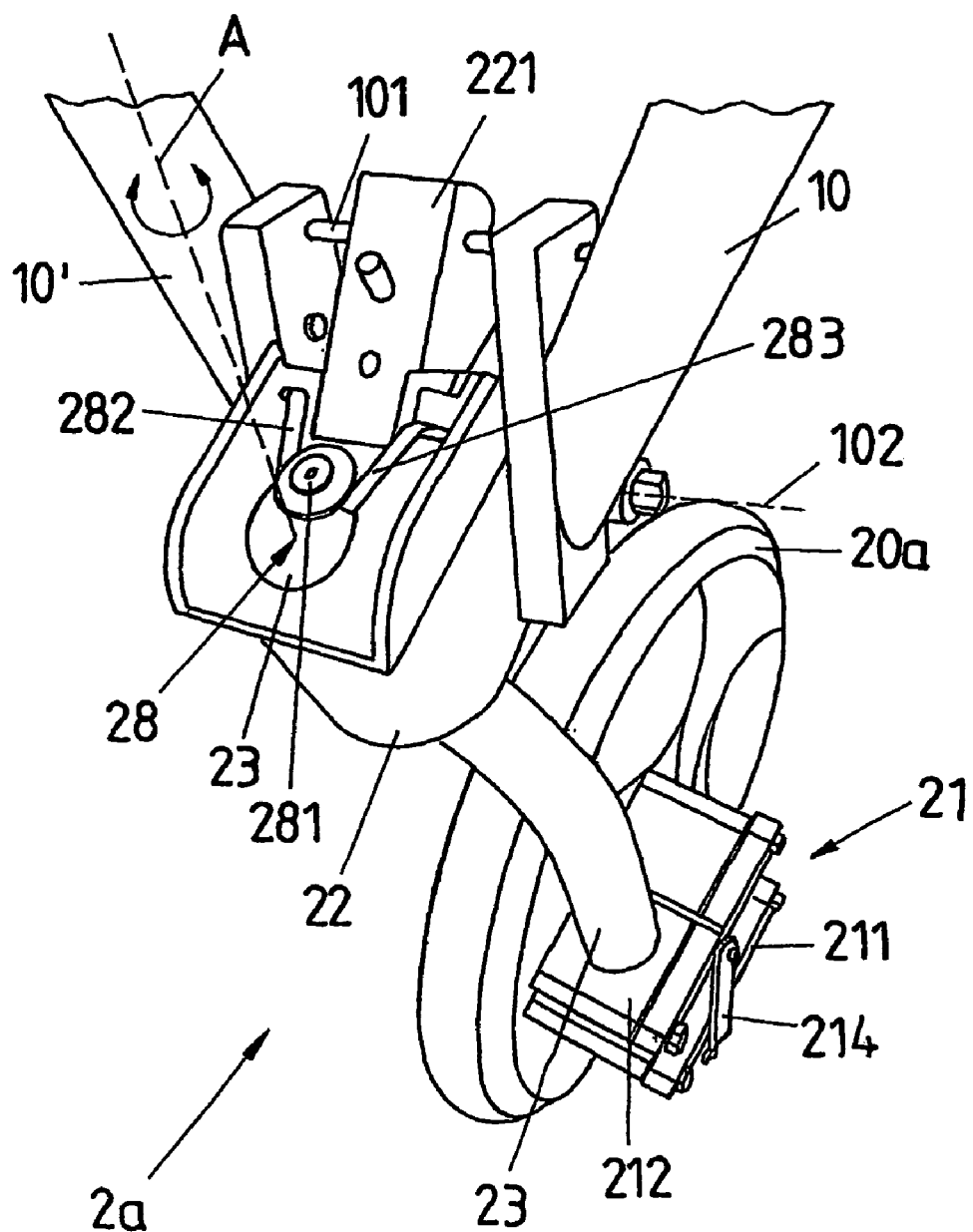
FIG. 10 shows a view, in detail form, of a front rolling device which is arranged in a rotatable manner on the trolley frame and has a mechanical restoring device for the rolling device.

As is illustrated in FIG. 10, the front rolling device 2a also has a spring-mounting arrangement 21, as is described in FIG. 9. In this case, the pivoting arms 211, 212 on the front rolling device 2a are correspondingly articulated in a pivotable manner on the bearing arm 23 of the front wheel 20a, the bearing element 213 (shown in FIG. 9) together with the front wheel 20a being arranged in a state in which it has been rotated through 90° in relation to the illustration in FIG. 9. The spring element assigned to the spring-mounting arrangement 21 of the front rolling device 2a is correspondingly arranged in the interior of the bottom end section of the bearing arm 23 of the front wheel 20a.

The top end of the bearing arm 23, as is already illustrated in FIG. 1, is mounted, such that it can be pivoted about an essentially vertically arranged axis A, in a bearing device 22 arranged at the front ends of the main struts 10, 10', said ends converging in a V-shaped manner. In the region of the bearing device 22, the front rolling device 2a has a restoring device 28. This restoring device 28 comprises an eccentric bolt 281, which is arranged at the top end of the bearing arm 23 in an eccentric manner in relation to the axis of rotation A, and two restoring elements 282, 283, which butt against the eccentric bolt 281. The restoring elements 282, 283 are of elongate design, one end butting against the eccentric bolt 281 and the other end being fixed on the bearing device 22. In the straight-ahead position of the front wheel 20a, i.e. when the latter is oriented essentially parallel to the rear wheels 20b, 20b', the eccentric bolt 281 is arranged essentially symmetrically to the two restoring elements 282, 283, and the restoring elements 282, 283 do not subject the eccentric bolt 281 to any force.

Upon rotation of the front wheel 20a and thus of the bearing arm 23 about the axis A, the eccentric bolt 281 deflects one of the two restoring elements 282, 283 transversely to the direction in which it extends. The deflected restoring element 282, 283, which is fixed on the bearing device 22 by way of its end which is directed away from the eccentric bolt 281, is formed from a flexurally elastic material, for example from a suitable steel, with the result that the deflected, i.e. bent restoring element 282, 283 does not subject the eccentric bolt 281 to any force. On account of the eccentric bolt 281 being arranged eccentrically relative to the axis of rotation A, the restoring force exerted by the restoring element 282, 283 gives rise to a torque which is directed onto the position of the eccentric bolt 281 corresponding to a straight-ahead position of the front wheel. In order to deflect the front wheel 20a of the transport trolley, the person who is moving the transport trolley thus has to use the handle arrangements 14, 14' and/or the coupling elements 16, 16' to exert a torque which is greater than the restoring torque produced by the restoring device 28. The restoring device 28 makes it easier, following a steering operation of the transport trolley, to restore the front wheel 20a into the straight-ahead position.

The restoring device 28 is also used for tracking stabilization of the transport trolley during movement in a transporting direction T. The restoring device prevents the situation where, in particular when the transport trolley is moving quickly over terrain, torques which are caused by unevennesses in the ground and act on the front wheel 20a result in the front wheel 20a suddenly being deflected to a pronounced extent. Such undesired movements of the front wheel 20a, in particular when the transport trolley is moving quickly, may result in the trolley tilting over. As a further safeguard, provision is made for the bearing device 22 of the front wheel 20a to be designed such that the front wheel 20a is mounted such that it can be rotated, out of the straight-ahead position, exclusively over an angle range of around 80° to the left and around 80° to the right.

Of course, the restoring device 28 may also be designed with restoring elements 282, 283 in the form of leaf springs or helical springs. The only essential factor is the above-described functional interaction of the components of the restoring device 28, which, in particular, achieves the desired tracking stabilization.

The front rolling device 2a which is illustrated in FIG. 10 is designed, as has already been described in conjunction with FIG. 3, such that it can be pivoted about an essentially horizontally running pivot axis 102 arranged in the region of those ends of the main struts 10, 10' which are directed toward the bearing device 22. In the illustration shown in FIG. 10, a fixing element 221 arranged on the bearing device 22 secures the front rolling device 2a against pivoting about the pivot axis 102. For this purpose, the fixing element 221 is connected in a releasable manner to a crossmember 101 which runs between the end regions of the main struts 10, 10'. Since the two main struts 10,10' are coupled mechanically to the bearing device 22 and the bearing arm 23 via the fixing element 221, the non-cushioned forces which act on the front wheel are introduced into the two main struts 10, 10'.

If the front rolling device 2a, together with the bearing device arranged on the trolley frame 1, is to be pivoted about the pivot axis 102 in the direction of the pyramid-like cage of the trolley frame 1, the fixing element 221 has to be released from the crossmember 101 beforehand. In the pivoted position provided for use as a vehicle trailer, the front rolling device 2a is fixed in a releasable manner on the trolley frame via fixing means which are not illustrated in FIG. 10.

In conjunction with the above-described features, i.e. the wheel-base setting, the spring-mounting arrangement of the rolling devices, the upwardly pivotable front rolling device and the restoring device of the front wheel, the transport trolley provided is one which can be adapted to the respectively required conditions, is thus very flexible to use and is designed in a robust manner such that it is suitable for all terrains. On account of the collapsible trolley-frame construction, the transport trolley, in addition, can also be collapsed to a very small packing size and is thus suitable, in particular, for transportation in motorized vehicles.

The invention claimed is:

1. A transport trolley for transporting at least one of the group consisting of goods and people, comprising:
    a trolley frame constructed from strut elements; and
    at least three rolling devices, which are provided on the trolley frame and have wheels for rolling the transport trolley in a transporting direction along an underlying surface,
    one of the rolling devices, as a front rolling device, being arranged on the trolley frame, as seen in the transporting direction of the transport trolley, in front of the other two, rear rolling devices, a wheel base between the front rolling device and the rear rolling devices being set by an adjusting device of the trolley frame which comprises two generally horizontal struts, wherein the trolley frame has two main struts, two supporting struts, the two generally horizontal struts and at least one transverse strut, the main struts which, starting from a region on the two supporting struts above each of the two rear rolling devices, are arranged such that they converge in an essentially V-shaped manner in the direction of the front rolling device, wherein the two generally horizontal struts, the at least one transverse strut and the two main struts define a cage, wherein the main struts thereof serve as a rollover bar of the cage in the event of the transport trolley tilting over.

2. The transport trolley as claimed in claim 1, wherein the horizontal struts of the trolley frame are length-adjustable.

3. The transport trolley as claimed in claim 2, wherein the horizontal, length-adjustable struts of the trolley frame are arranged essentially horizontally in the region between the front rolling device and the rear rolling device of the trolley frame.

4. The transport trolley as claimed in one of claims 1 to 3, wherein the main struts curve concavely upward.

5. The transport trolley as claimed in claim 3, wherein the two supporting struts of the trolley frame are arranged between two end sections of the main struts that are arranged above the rear rolling devices and in each case one of the rear rolling devices arranged therebeneath.

6. The transport trolley as claimed in claim 5, wherein a left-hand length-adjustable strut is arranged between a left-hand main strut, as seen in the transporting direction, and a left-hand supporting strut and a right-hand length-adjustable strut is arranged between a right-hand main strut and a right-hand supporting strut.

7. The transport trolley as claimed in claim 5 or 6, wherein the at least one transverse strut is arranged between the two supporting struts.

8. The transport trolley as claimed in claim 7, wherein the supporting struts are fastened on the main struts with upper articulation devices, and the length-adjustable struts are fastened on the main struts and on the supporting struts via lower articulation devices.

9. The transport trolley as claimed in claim 8, wherein the supporting struts are length-adjustable.

10. The transport trolley as claimed in claim 7, wherein the at least one transverse strut comprises a plurality of transverse struts having an arrestable folding articulation in a center thereof.

11. The transport trolley as claimed in claim 7, wherein at least one of group selected from the main struts and the supporting struts, above the rear rolling devices, have at least one handle device for holding and steering the transport trolley.

12. The transport trolley as claimed in claim 11, wherein the handle device is of height-adjustable design.

13. The transport trolley as claimed in claim 11, wherein at least one of the rolling devices has a braking arrangement for braking the rolling movement of the transport trolley, and wherein the braking arrangement is adapted to be triggered by an actuating arrangement provided in the region of the handle device.

14. The transport trolley as claimed in claim 2, wherein a device for accommodating the at least one good which is to be transported and person who is to be transported is fixed on at least one of the generally horizontal struts and on the main struts.

15. The transport trolley as claimed in claim 1, wherein at least one of the rolling devices has a spring-mounting arrangement.

16. The transport trolley as claimed in claim 15, wherein spring excursion of the spring-mounting arrangement is at least one fifth of the diameter of the wheel of the associated rolling device.

17. The transport trolley as claimed in claim 1, wherein the front rolling device is mounted on the trolley frame such that it can be rotated about an essentially vertically arranged axis.

18. The transport trolley as claimed in claim 17, wherein the front rolling device is mounted such that it can be rotated over an angle range of less than 180°.

19. The transport trolley as claimed in claim 17 or 18, wherein the front rolling device has a mechanical restoring device by which the at least one wheel assigned to the front rolling device, when pivoted out of a generally straight ahead position in which it is oriented essentially parallel to the running direction of the wheels of the rear rolling devices, is subjected to a torque which directs it back into the generally straight ahead position.

20. The transport trolley as claimed in claim 1, wherein the two generally horizontal struts comprise two sub-struts that slide relative to each other.

21. A transport trolley for transporting at least one of the group consisting of goods and people, comprising:
    a trolley frame constructed from strut elements; and
    at least three rolling devices, which are provided on the trolley frame and have wheels for rolling the transport trolley in a transporting direction along an underlying surface,
    one of the rolling devices, as a front rolling device, being arranged on the trolley frame, as seen in the transporting direction of the transport trolley, in front of the other two, rear rolling devices, a wheel base between the front rolling device and the rear rolling devices being set by an adjusting device of the trolley frame, wherein the trolley frame has two main struts which, starting from a region above each of the two rear rolling devices, are arranged such that they converge in an essentially V-shaped manner in the direction of the front rolling device, and the two main struts serve as a rollover bar in the event of the transport trolley tilting over, wherein the front rolling device is articulated on the trolley frame such that it is pivotable upwardly.

22. The transport trolley as claimed in claim 21, wherein a coupling device for coupling the transport trolley to a towing vehicle, can be coupled on the trolley frame in the region of the front rolling device.

23. The transport trolley as claimed in claim 22, wherein the towing vehicle comprises a bicycle.

24. A transport trolley for transporting at least one of the group consisting of goods and people, comprising:
    a trolley frame constructed from strut elements; and
    at least three rolling devices, which are provided on the trolley frame and have wheels for rolling the transport trolley in a transporting direction along an underlying surface,
    one of the rolling devices, as a front rolling device, being arranged on the trolley frame, as seen in the transporting direction of the transport trolley, in front of the other two, rear rolling devices, a wheel base between the front rolling device and the rear rolling devices being set by an adjusting device of the trolley frame which comprises two generally horizontal struts, wherein the trolley frame has two main struts, two supporting struts, the two generally, horizontal struts and at least one transverse strut, the main struts which, starting from a region on the two supporting struts above each of the two rear rolling devices, converge in an essentially V-shaped manner in the direction of the front rolling device, wherein the main struts span between the front rolling device and the two supporting struts and, at least near the region of connection to the supporting struts, the main struts are upwardly directed relative to an imaginary straight line extending from one end near the front rolling device to another end at which the two supporting struts are connected to the supporting struts, and wherein the at least one transverse strut and the two main struts define a cage, wherein the main struts thereof serve as a rollover bar of the cage in the event of the transport trolley tilting over.

* * * * *